United States Patent [19]

Bart et al.

[11] 3,995,813

[45] Dec. 7, 1976

[54] PIEZOELECTRIC FUEL INJECTOR VALVE

[76] Inventors: Hans U. Bart, 3820 Duck Lake Road, Whitehall, Mich. 16852; Robert Chick, 16852 Harkness Circle, Huntington Beach, Calif. 92649

[22] Filed: Sept. 27, 1974
(Under Rule 47)

[21] Appl. No.: 509,931

[52] U.S. Cl. .......................... 239/584; 123/32 AE; 123/32 JV
[51] Int. Cl.² ..................................... B05B 1/30
[58] Field of Search ................ 123/32 JV, 32 AE; 239/584, 585; 417/383

[56] References Cited

UNITED STATES PATENTS

| | | | |
|---|---|---|---|
| 3,418,980 | 12/1968 | Benson | 123/32 AE |
| 3,501,099 | 3/1970 | Benson | 239/585 |
| 3,598,506 | 8/1971 | O'Neill | 417/383 |
| 3,704,833 | 12/1972 | Wheat | 239/585 |
| 3,830,204 | 8/1974 | McAlister | 123/32 AE |

Primary Examiner—Wendell E. Burns
Assistant Examiner—David D. Reynolds

[57] ABSTRACT

An electrically operated valve in which the valve operating means is controlled in its opening movement by a piezoelectric element and in which the rate of such movement is increased by the cooperative movement of a vaulted spring washer. The expansion or contraction of the piezoelectric element provides a lift force to the valve operating means and also a force against a vaulted spring washer to push the washer surface past a point of instability. Similarly, on closure of the valve, a sudden closing force is exerted against said means by the return snapping, or vaulting, of said washer. Preferably, a hydraulic or mechanical amplification of the stroke of the piezoelectric element is included to provide an exceedingly rapid mode of operation. The valve is particularly advantageous to control the multiple and discreet injections of fuel into an internal combustion engine.

10 Claims, 3 Drawing Figures

PIEZOELECTRIC FUEL INJECTOR VALVE

BACKGROUND OF THE INVENTION

This invention relates to valves, particularly those valves employed in fuel injection systems for internal combustion engines. More particularly, the valves of the invention use the change in dimensions of a piezoelectric element to effect movement of a valve needle from a closed position to an open position.

It is known that upon application of an electrical field across piezoelectric materials they expand or contract along known axes, depending on the direction in which the electrical field is applied. It is further known to stack a number of piezoelectric elements so that their cumulative expansion or contraction effect provides an increased mechanical movement. It is also known that piezoelectric elements having these expanding and contracting properties can be used to pump fuel from an injector by alternating an imposed electric field at suitable intervals. For example, Benson in U.S. Pat. No. 3,391,680 describes such a pump where the piezoelectric element is used to pressurize the fuel.

The present invention does not relate to a piezoelectric actuated pump wherein the piezoelectric element pressurizes and pumps the fuel but rather relates to a valve for precise metering and control of small quantities of an already pressurized fluid.

In conventional fuel injection systems, high pressure, timed metering pump systems are used with relatively inexact timing and with non-uniform injected amounts of fuel. These are especially unsuitable for diesel engines and result in incomplete combustion which in turn increases adverse effects including both air and noise pollution.

In a copending commonly assigned patent application by Hans U. Bart, Ser. No. 509892, filed 4/3/75 there is disclosed an improved fuel injector valve wherein a close control of the timing, the amount of fuel injected and the number of injections is possible. A valve body is supplied with fuel under pressure, e.g. about 6000 psi. The fuel is normally held in the valve body by a normally closed injector port which is maintained closed by a needle or other valve closure means seated in the port. A piezoelectric element cooperates with the needle in a manner such that the imposition of an electric field across the element changes its dimensions, either expanding it or contracting it, and effects movement of both the element and the needle. The latter movement opens the valve port permitting the pressurized fuel to jet therefrom.

The invention disclosed in said copending patent application also provides a mechanical or hydraulic amplification means to magnify the stroke of the piezoelectric element to lift, for example, the needle closing the valve opening. Such a valve is exceedingly fast and capable of response within microseconds, making it particularly suitable for injection control of diesel engines. The injector valve disclosed therein thus provides a combination of control flexibility and instantaneous response.

SUMMARY OF THE INVENTION

The present invention is an improvement on the invention disclosed in the above mentioned copending patent application and has as its principal objectives an improved means for biasing the valve toward its closed position and the increasing of the rate of movement of the valve closure means. The injector of the invention includes a "vaulted spring washer" which cooperates with the piezoelectric element and valve closure means to accomplish those objectives.

The term, "vaulted spring washer", as used herein, refers to a device which, in one embodiment, has the appearance of a domed, or vaulted, washer or disc and wherein, in response to a force exerted againt the center portion of the convex side of the dome, or vault, the washer surface approaches first a point of instability due to the build up of compressive forces within the metal and then, as the washer surface passes said point of instability, it suddenly snaps, or vaults, to a new position. The washer may then vault to its original position either spontaneously by a release of the originally applied force or by a newly applied counterforce, or both.

The present injector comprises, for example, (a) a valve needle which normally closes the outlet port of the valve; (b) a piezoelectric element which, responsively to the imposing of an electric potential, changes dimensions and lifts the valve needle from the outlet port to effect a jetting of the pressurized fluid from within the valve body; (c) a vaulted spring washer; and, (d) preferably, an additional biasing means to force the spring washer and the valve needle toward the closed position.

The invention also provides for combining the vaulted spring washer in a structure with means for magnifying the effective stroke of the piezoelectric element, examples of the latter means being disclosed herein and in said copending application.

DETAILED DESCRIPTION OF THE PREFERRED EMBODIMENT

Figure 1:
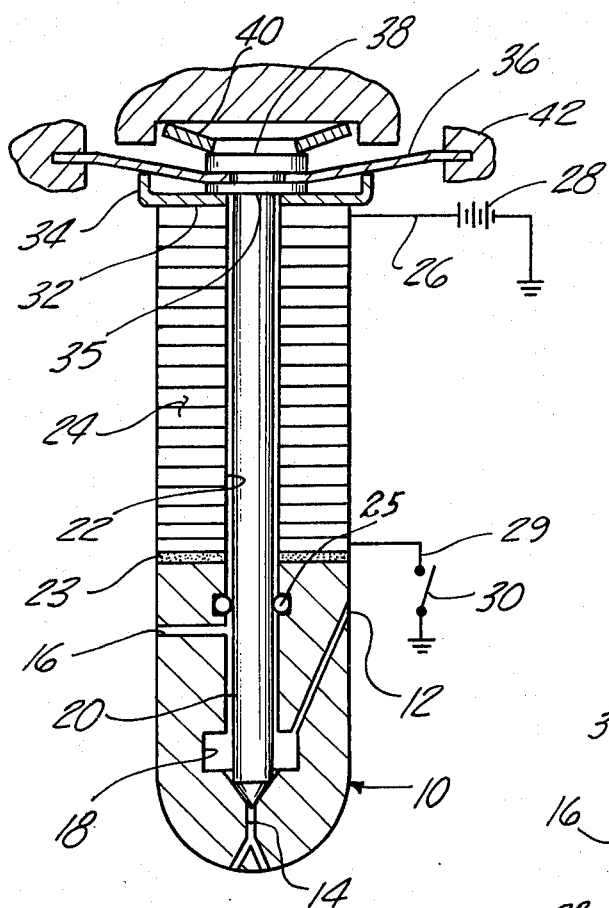
FIG. 1 is a diagrammatic cross sectional view of the fuel injector valve of the invention which illustrates the use of a vaulted spring washer in cooperation with a piezoelectric element to effect a rapid opening and closing of the valve.
Figure 2:
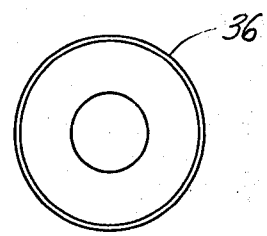
FIG. 2 is a plan view of the vaulted spring washer shown in FIG. 1.

Referring to FIG. 1, a valve housing 10 is provided with a fluid inlet port 12, a fluid outlet or exit port 14, a leak off port 16 and an intermediate fluid storage chamber 18. The inlet port 12 is in fluid communication with a source of pressurized fluid (not shown) and the leak off port 16 can be placed in fluid communication with a check valve (not shown) to maintain the fluid under pressure within the housing 10.

A needle valve 20 normally seats in and closes the exit port 14. The needle valve 20 extends upwardly through a central passageway 22 in an axially extending stack of piezoelectric discs 24 which rest on the fixed platform 23. An O-ring 25 surrounding needle 20 serves as a fluid seal. Wire 26 attached to battery 28 and electric wire 29 grounded through switch 30 provide a source of electrical potential longitudinally across the piezoelectric element 24. As shown in FIG. 1, the imposing of an electric potential across stack 24 effects the longitudinal expansion of the stack.

A washer 32 with annular flange 34 is positioned on the top of stack 24 for movement therewith. Needle head 35 at the top of needle 20 is axially positioned between the flanged washer 32 and a vaulted spring washer 36. A washer 38 is positioned between said vaulted spring washer 36 and a Belleville washer 40, the latter serving to bias the needle 20 toward the exit port 14 in the absence of an imposed potential across piezoelectric stack 24.

The vaulted spring washer 36 is secured to a fixture or walls 42 in any suitable manner. The vaulted spring washer 36 which, as shown, is concave on its upper side is constructed such that if it is pushed upwardly against its convex side until it passes a point of instability due to the build up of compressive forces it will suddenly vault upwardly.

The degree to which the washer 36 is vaulted is exaggerated in the drawings for the purposes of illustration of its mode of action. Because the purpose of the washer 36 is to magnify the already rapid movement of the piezoelectric element it is important to construct the washer 36 in a manner such that its overall stroke does not significantly exceed the necessary distance through which the needle 20 must move to effectively open the outlet port 14. By way of example, if it is determined that the needle 20 should lift 0.05 inch, then the diameter of the washer 36 and the height of its vault should be selected such that its center moves through a distance of about 0.05 inch. The latter specification minimizes the distance through which the piezoelectric element 24, needle 20, and vaulted spring washer 36 must move before the washer 36 passes over its position of instability and vaults to its new position.

Figure 3:
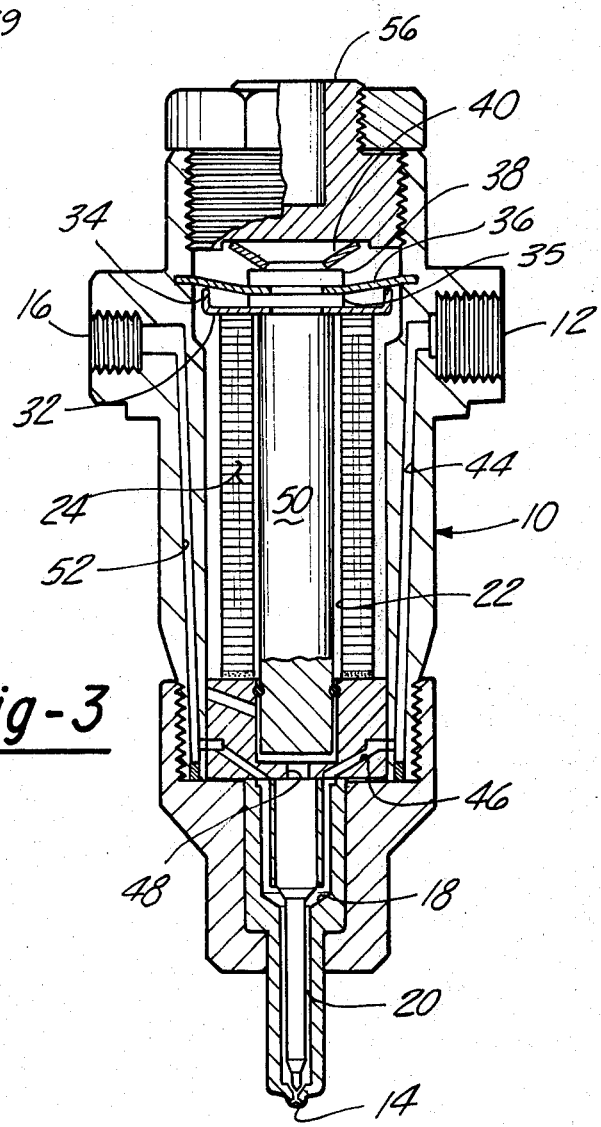
FIG. 3 is a diagrammatic cross sectional view of an alternative fuel injection valve of the invention wherein the length of the stroke of the valve needle is greater than the corresponding length of the stroke of the piezoelectric element.

Referring to FIG. 3, a valve body 10 has a fluid inlet port 12, a fluid outlet port 14, and a leak off port 16. Fluid inlet port 12 leads to a liquid inlet channel 44 then to a channel 46 then to the storage chamber 18, and then to exit port 14. The channel 46 also leads to a fluid chamber 48 which separates the top of the valve needle 20 from the bottom of a piston 50, the latter mounted in the central passage 22 of the piezoelectric stack 24. The channel 46 and the fluid chamber are also in fluid communication with a fluid leak off channel 52 and the leak off port 16.

The structure associated with the vaulted spring washer 36 and Belleville washer 40 of FIG. 3 is similar to that of FIG. 1 except that, in FIG. 3, there is shown an adjustable nut 56 for purposes of adjusting the tension on Bellville washer 40.

In the operation of the injector of FIG. 1, a direct current potential is imposed longitudinally across the piezoelectric stack 24 causing it to expand longitudinally. Expansion of the stack 24 lifts needle head 35 and needle 20, thus initiating the opening of the exit port 14. As needle head 35 and flanged washer 32 rise, the central vaulted portion of vaulted spring washer 36 is pushed upwardly past a point of instability at which point it vaults upwardly to apply a sudden compressive force against the Belleville washer 40.

When the potential imposed across the stack is removed, the stack 24 contracts and relieves the force acting upwardly against the Belleville washer 40. The latter then pushes the washer 38, the center portion of the vaulted spring washer 36, the needle head 35, and the needle 20 downwardly until the spring washer 36 passes its point of instability. At the latter point the washer 36 vaults toward its original position (as shown in FIG. 1), thus adding sharply to the biasing force pushing downwardly against the needle 20 in its valve closing movement.

The Belleville washer 40, although preferred, may be omitted where the downward movement of the vaulted spring washer 36 is spontaneous upon the release of the upward force of the expanding piezoelectric element 24 and particularly where the downwardly biasing force of such vaulted spring washer is sufficient to provide an adequate force directed toward the closing of the injector.

In the operation of the injector of FIG. 3, a direct current voltage is imposed longitudinally on the stack 24 in a manner to effect the expansion thereof. This causes the piston 50 to move vertically (as shown). Upward movement of the piston 40 relieves the pressure within the chamber 48, thus creating a differential hydraulic pressure on the needle 20 and causing the needle to rise. A lifting of the needle 20 opens the outlet port 14 whereupon the pressurized fuel within the valve body jets outwardly. Because the cross sectional area of the bottom of piston 50 is greater than the effective cross sectional area of the needle the length of the stroke of the needle will be greater than the length of the stroke of the piezoelectric element and the stroke of the piston.

Thus, in the injector of FIG. 3, the stroke of the needle 20 is magnified relative to the stroke of the piezoelectric element 24 by hydraulic means and further, when the vaulted spring washer has passed its point of instability in its upward movement and has vaulted upwardly, the rate of upward movement of the piston, and consequently the needle 20, is suddenly increased. Similarly, when the potential across the piezoelectric element is removed and the latter contracts, the vaulted spring washer 36 vaults downwardly to effect a sudden extra force on the downward or closing, movement of the needle 20.

As disclosed in the above mentioned copending application the hydraulic magnification means can be replaced by mechanical amplification means. Similarly, and as will be apparent, the Belleville washer 40 can be replaced with other spring or resilient means.

The major advantages of the invention are derived from the fact that the piezoelectric element responds rapidly to the imposed electric potential which rapid response can be further improved, particularly upon contraction of the piezoelectric element, by the use of the vaulted spring washer in the manner described.

Because of the rapid response to the valve needle, the duration of injections can be easily controlled within 1 microsecond without ragged spray initiation or termination dribble, making possible carefully controlled multiple and discreet injections into an engine cylinder as the piston approaches top dead center. The latter characteristic has shown to be of particular advantage in diesel engine where the released heat and pressure rise in the cylinder can be controlled by the rate and number of injections, eliminating "detonation" type fuel combustion and effecting more complete combustion of the fuel at lower peak temperatures and pressures.

It will thus be seen that I have provided a novel and improved piezoelectric operated valve of a type which is of particular utility for internal combustion engine injection systems.

I claim:

1. In a liquid fuel injector valve having a valve body adapted to hold liquid fuel under pressure, a fuel outlet port, a closure means for said outlet port movable between a first position where said outlet port is closed and a second position where said outlet port is open, a piezoelectric element cooperative with said closure means and adapted to effect the movement of said closure means to said second position responsively to the imposition of an electrical potential across said element; the improvement which comprises:

a vaulted spring washer cooperative with said element such that movement of said element in response to said potential effects the application of a force against said washer in a manner to effect the vaulting of said washer in the direction of movement of said element, and such that, upon removal of said potential a reverse vaulting of said washer is effected biasing and closure means toward said first position.

2. The valve as defined in claim 1 wherein said closure means is a valve needle which, in said first position, seats in said outlet port.

3. The valve as defined in claim 2 and comprising means cooperative with said needle to amplify the stroke of said needle relative to said element.

4. The valve as defined in claim 3 wherein said amplifying means operates mechanically.

5. The valve as defined in claim 3 wherein said amplifying means operates hydraulically.

6. The valve as defined in claim 1 and additionally comprising a second biasing means adapted to apply a force against said vaulted spring washer during said reverse vaulting movement.

7. The valve as defined in claim 1 wherein said piezoelectric element is in the form of a stack of coaxial discs.

8. The valve as defined in claim 2 wherein said element is in the form of a stack of coaxial discs and wherein said stack has a central passageway adapted to receive a piston, said piston being attached to said stack for longitudinal movement therewith and cooperative with said needle to effect the movement of said needle between said positions.

9. The valve as defined in claim 6 wherein said closure means is a valve needle which seats in said outlet port, wherein said element is in the form of a stack of coaxial discs, wherein said biasing means is a Belleville washer and wherein said valve further comprises means to amplify said movement such that the stroke of said needle during the opening of said valve is greater than the stroke of said element in response to said potential.

10. A liquid fuel injector valve for an internal combustion engine, said valve comprising:

a. a generally cylindrical valve body adapted to contain liquid fuel therein under pressure, said valve body having a liquid fuel inlet port and a liquid fuel outlet port;

b. a valve needle movable axially between a first position where said needle closes said outlet port and a second position where said outlet port is open;

c. a piezoelectric element in the form of a stack of coaxial piezoelectric discs cooperative with said needle for effecting movement of said needle to said second position in response to an electrical potential imposed across said element;

d. an axially extending extending passageway through said stack;

e. a piston positioned within said passageway and attached to said stack for axial movement therewith;

f. a liquid chamber positioned axially between said piston and said needle wherein movement of said piston in a direction away from said outlet port effects a reduction in liquid pressure within said chamber thereby creating a differential pressure across said needle in a manner to effect said movement of said needle to said second position; and g. a vaulted spring washer cooperative with said element and said piston such that movement of said element in response to said potential effects the application of a force against said washer in a manner to effect the vaulting of said washer in the direction of movement of said element and such that, upon removal of said potential, a reverse vaulting of said washer is effected biasing said valve needle toward its closed position.

\* \* \* \* \*

UNITED STATES PATENT OFFICE
CERTIFICATE OF CORRECTION

Patent No. 3,995,813            Dated December 7, 1976

Inventor(s) Hans U. Bart et al

It is certified that error appears in the above-identified patent and that said Letters Patent are hereby corrected as shown below:

Column 4, line 14, after "vertically" insert -- upwardly --.

Column 5, line 16, "and" should read -- said --.

Signed and Sealed this

Fifth Day of April 1977

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,995,813      Dated December 7, 1976

Inventor(s) Hans U. Bart et al.

It is certified that error appears in the above-identified patent and that said Letters Patent are hereby corrected as shown below:

On the first page insert -- [73] Assignee: Teledyne Industries, Inc., Los Angeles, California --.

On the first page, delete "(Under Rule 47)".

Signed and Sealed this

Sixth Day of September 1977

[SEAL]

Attest:

RUTH C. MASON
*Attesting Officer*

LUTRELLE F. PARKER
*Acting Commissioner of Patents and Trademarks*